(12) United States Patent
Pedigo et al.

(10) Patent No.: US 11,260,413 B2
(45) Date of Patent: Mar. 1, 2022

(54) END EFFECTOR FOR DELIVERING MATERIAL TO A SURFACE AND ASSOCIATED SYSTEM

(71) Applicants: The Boeing Company, Chicago, IL (US); University of Washington, Seattle, WA (US)

(72) Inventors: Samuel F. Pedigo, Lake Forest Park, WA (US); Joshua A. Babst, Enumclaw, WA (US); Ricardo A. Fritzke, Seattle, WA (US); Samuel O. Marriott-Green, Centennial, CO (US); Mitchell S. Middleton, Seattle, WA (US); Ray Adler, Olympia, WA (US)

(73) Assignee: The Boeing Company, Chicago, IL (US)

(*) Notice: Subject to any disclaimer, the term of this patent is extended or adjusted under 35 U.S.C. 154(b) by 330 days.

(21) Appl. No.: 16/443,641

(22) Filed: Jun. 17, 2019

(65) Prior Publication Data

US 2020/0391240 A1  Dec. 17, 2020

(51) Int. Cl.
*B25J 19/02* (2006.01)
*B05B 13/04* (2006.01)
(Continued)

(52) U.S. Cl.
CPC ......... *B05B 13/0431* (2013.01); *B25J 9/0009* (2013.01); *B25J 19/02* (2013.01); *B25J 9/1694* (2013.01)

(58) Field of Classification Search
CPC ........ B25J 9/0009; B25J 9/1694; B25J 19/02; B25J 15/0019; B25J 15/0491; B25J 11/0065; B25J 13/00; B25J 15/0061; B25J 13/085; B25J 9/009; B25J 9/161; B25J 9/1633; B05B 13/0431; B05B 12/00; B05B 15/00; B05B 15/68; B05B 7/1481; B05B 12/002; A61B 17/2909; A61B 2017/00477; A61B 2017/0003; A61B 2017/00353;
(Continued)

(56) References Cited

U.S. PATENT DOCUMENTS 7,703,495 B2   4/2010  Hoffman
9,308,692 B2   4/2016  Pedigo et al.
(Continued)

OTHER PUBLICATIONS

Chandrasekaran et al., MagNex—Expendable robotic surgical tooltip, 2017, IEEE, pg. (Year: 2017).*
(Continued)

*Primary Examiner* — Mcdieunel Marc
(74) *Attorney, Agent, or Firm* — Kunzler Bean & Adamson

(57) ABSTRACT

An end effector, coupleable to a robot, for delivering a material to a surface, comprises a material applicator assembly, comprising a central shaft and an applicator co-rotatably coupled to the central shaft and configured to apply the material to the surface. The end effector also comprises a material supply carrier, comprising a base and a supply of the material coupled to the base. The material from the supply is feedable to the applicator. The end effector further comprises an actuator that rotatably couples the material supply carrier with the material applicator assembly. The actuator is operable to rotate the material supply carrier relative to the material applicator assembly.

20 Claims, 13 Drawing Sheets

(51) Int. Cl.
*B25J 9/00* (2006.01)
*B25J 9/16* (2006.01)

(58) Field of Classification Search
CPC .............. A61B 34/32; A61B 17/07207; A61B 17/1655; B05C 17/023; B05C 1/16; Y10T 483/17; Y10T 29/5118; Y10T 483/1752; Y10T 29/5107; F16D 1/087; B05D 1/12; B64F 5/00; B23P 19/04; B23P 19/06; Y10S 483/901; Y10S 901/02; Y10S 901/43; Y10S 483/90; Y10S 901/09
See application file for complete search history.

(56) References Cited

U.S. PATENT DOCUMENTS

| 10,137,648 | B2 | 11/2018 | Pedigo et al. | |
|---|---|---|---|---|
| 2019/0258275 | A1* | 8/2019 | Saunders | ................ B25J 9/162 |
| 2020/0164395 | A1* | 5/2020 | Schoen | ................... B05B 1/306 |
| 2020/0206924 | A1* | 7/2020 | Pivac | ...................... G06F 30/13 |
| 2020/0298268 | A1* | 9/2020 | Henderson | ............ B24B 41/005 |
| 2020/0306978 | A1* | 10/2020 | Riek | ....................... B25J 9/1617 |
| 2021/0129456 | A1* | 5/2021 | Inagaki | .................. B29C 70/38 |
| 2021/0138646 | A1* | 5/2021 | Matsushima | .......... B25J 11/005 |

OTHER PUBLICATIONS

Brwown et al., A precision manipulator module for assembly in a minifactory environment, 2001, IEEE, pg. (Year: 2001).*

Liyanage et al., Design and control of a high performance SCARA type robotic arm with rotary hydraulic actuators, 2009, IEEE, pg. (Year: 2009).*

Kazerooni et al., A robotic end-effector for grasping postal sacks, 2003, IEEE, pg. (Year: 2003).*

* cited by examiner

END EFFECTOR FOR DELIVERING MATERIAL TO A SURFACE AND ASSOCIATED SYSTEM

FIELD

This disclosure relates generally to end effectors that are coupleable to robots, and more particularly to an end effector that delivers material to a surface for forming a part.

BACKGROUND

Some conventional end effectors are equipped with a material supply and an application tool for delivering the material supply. The end effector is coupled to a robot, which moves the end effector while the material is delivered by the application tool to form a part. Mounting the material supply onboard the end effector provides benefits over systems with the material supply grounded relative to the end effector. Such benefits include ease in maneuvering the application tool to form complex parts. Ideally, high quantities of material are included onboard the end effector to reduce the frequency of refilling the material supply. However, mounting high quantities of material onboard the end effector makes manufacturing of parts with complex surfaces difficult.

SUMMARY

The subject matter of the present application provides examples of an end effector and corresponding system for forming parts that overcome the above-discussed shortcomings of prior art techniques. The subject matter of the present application has been developed in response to the present state of the art, and in particular, in response to shortcomings of conventional end effectors, and the conventional methods and systems for forming parts using conventional end effectors.

Disclosed herein is an end effector, coupleable to a robot, for delivering a material to a surface. The end effector comprises a material applicator assembly comprising a central shaft and an applicator. The applicator is co-rotatably coupled to the central shaft and configured to apply the material to the surface. The end effector also comprises a material supply carrier that comprises a base and a supply of the material coupled to the base. The material from the supply is feedable to the applicator. The end effector further comprises an actuator that rotatably couples the material supply carrier with the material applicator assembly. The actuator is operable to rotate the material supply carrier relative to the material applicator assembly. The preceding subject matter of this paragraph characterizes example 1 of the present disclosure.

The material comprises material tapes. The supply comprises a plurality of spools each comprising one of the material tapes. The applicator comprises a compaction roller that is rotatable about a roller axis to apply the material tapes onto the surface. The actuator rotates the material supply carrier, about a central axis perpendicular to the roller axis, relative to the material applicator assembly. The preceding subject matter of this paragraph characterizes example 2 of the present disclosure, wherein example 2 also includes the subject matter according to example 1, above.

The base is elongated. A length of the base is perpendicular to the central axis. The preceding subject matter of this paragraph characterizes example 3 of the present disclosure, wherein example 3 also includes the subject matter according to example 2, above.

Each of the spools is rotatable, about a spool axis, relative to the base to release the material tape from the spool. The spool axis is perpendicular to the length of the base and the central axis. The preceding subject matter of this paragraph characterizes example 4 of the present disclosure, wherein example 4 also includes the subject matter according to example 3, above.

The actuator is further operable to rotate the material supply carrier relative to the material applicator assembly while the material from the supply is fed to the applicator and the material is applied onto the surface by the applicator. The preceding subject matter of this paragraph characterizes example 5 of the present disclosure, wherein example 5 also includes the subject matter according to any one of examples 1-4, above.

The actuator is further operable to rotate the material supply carrier relative to the material applicator assembly in response to a contour of the surface. The preceding subject matter of this paragraph characterizes example 6 of the present disclosure, wherein example 6 also includes the subject matter according to any one of examples 1-5, above.

The end effector further comprises an electronics control module fixed to the base and co-movable with the base. The electronics control module comprises electronics for controlling feed of the material from the supply to the applicator and for controlling the actuator. The preceding subject matter of this paragraph characterizes example 7 of the present disclosure, wherein example 7 also includes the subject matter according to any one of examples 1-6, above.

Further disclosed herein is a system for delivering a material to a surface. The system comprises a robot. The system also comprises an end effector, rotatably coupled to the robot. The end effector comprises a material applicator assembly that comprises a central shaft and an applicator that is co-rotatably coupled to the central shaft and configured to apply the material to the surface. The end effector also comprises a material supply carrier, comprising a base and a supply of the material. The material from the supply is feedable to the applicator. The end effector further comprises a first actuator, rotatably coupling the material supply carrier with the material applicator assembly. The first actuator is selectively operable to rotate the material supply carrier relative to the material applicator assembly. The robot is selectively operable to translationally move the end effector in an application direction while the applicator delivers the material from the supply to the surface. The preceding subject matter of this paragraph characterizes example 8 of the present disclosure.

The robot comprises a second actuator that is selectively operable to rotate the material applicator assembly, about a central axis of the central shaft of the material applicator assembly, relative to the robot. The preceding subject matter of this paragraph characterizes example 9 of the present disclosure, wherein example 9 also includes the subject matter according to example 8, above.

The first actuator of the end effector is operable independently of the second actuator of the robot to rotate the material supply carrier, relative to the material applicator assembly, independently of rotation of the material applicator assembly, relative to the robot, by the second actuator of the robot. The preceding subject matter of this paragraph characterizes example 10 of the present disclosure, wherein example 10 also includes the subject matter according to example 9, above.

The first actuator is further operable to automatically rotate the material supply carrier, relative to the material applicator assembly, in a first rotational direction a first angular dimension in response to the second actuator rotating the material applicator assembly, relative to the robot, in a second rotational direction, opposite the first rotational direction, a second angular dimension equal to the first angular dimension. The preceding subject matter of this paragraph characterizes example 10 of the present disclosure, wherein example 10 also includes the subject matter according to example 9, above. The preceding subject matter of this paragraph characterizes example 11 of the present disclosure, wherein example 11 also includes the subject matter according to any one of examples 9-10, above.

The first actuator is further operable to rotate the material supply carrier relative to the material applicator assembly in response to a contour of the surface. The preceding subject matter of this paragraph characterizes example 12 of the present disclosure, wherein example 12 also includes the subject matter according to any one of examples 8-11, above.

The first actuator rotates the material supply carrier about a central axis. The first actuator is further operable to rotate the material supply carrier relative to the material applicator assembly in response to an angle, defined between the central axis and the robot, decreasing below a predetermined minimum angle. The preceding subject matter of this paragraph characterizes example 13 of the present disclosure, wherein example 13 also includes the subject matter according to any one of examples 8-12, above.

The robot is a first robot and the end effector is a first end effector. The system further comprises a second robot and a second end effector. Each one of the first end effector and the second end effector is rotatably coupled to a corresponding one of the first robot and the second robot. The first actuator of the first end effector, rotatably coupled to the first robot, is further operable to automatically rotate the material supply carrier of the first end effector relative to the material applicator assembly of the first end effector in response to a distance between the first end effector and the second end effector decreasing below a predetermined minimum distance. The preceding subject matter of this paragraph characterizes example 14 of the present disclosure, wherein example 14 also includes the subject matter according to any one of examples 8-13, above.

A first actuator of the second end effector, rotatably coupled to the second robot, is further operable to automatically rotate a material supply carrier of the second end effector relative to a material applicator assembly of the second end effector in response to the distance between the first end effector and the second end effector decreasing below the predetermined minimum distance. The preceding subject matter of this paragraph characterizes example 15 of the present disclosure, wherein example 15 also includes the subject matter according to example 14, above.

Additionally disclosed herein is a method of delivering a material to a surface. The method comprises feeding the material from a supply, of a material supply carrier of an end effector rotatably coupled to a robot, to an applicator, of a material applicator assembly of the end effector. The method also comprises moving the applicator along the surface in an application direction to deliver the material to the surface. The method further comprises after the material is fed to the applicator from the supply, rotating the material supply carrier of the end effector relative to the material applicator assembly of the end effector. The preceding subject matter of this paragraph characterizes example 16 of the present disclosure.

The material supply carrier is rotated relative to the material applicator assembly while the material is fed to the applicator and while the applicator is moved along the surface in the application direction. The preceding subject matter of this paragraph characterizes example 17 of the present disclosure, wherein example 17 also includes the subject matter according to example 16, above.

The material supply carrier is elongated and has a length. The material supply carrier is rotated, relative to the material applicator assembly, from a first position, in which the length of the material supply carrier is parallel to the application direction, to a second position, in which the length of the material supply carrier is non-parallel to the application direction. The preceding subject matter of this paragraph characterizes example 18 of the present disclosure, wherein example 18 also includes the subject matter according to any one of examples 16-17, above.

The material supply carrier is rotated, relative to the material applicator assembly, from the first position to the second position when the surface, along which the applicator is moved, changes from a first concavity in the application direction to a second concavity in the application direction. The first concavity is either zero or non-zero. The second concavity is greater than the first concavity. The preceding subject matter of this paragraph characterizes example 19 of the present disclosure, wherein example 19 also includes the subject matter according to example 18, above.

The method further comprises rotating the material applicator assembly relative to the surface in a first rotational direction. Rotating the material supply carrier relative to the material applicator assembly comprises automatically rotating the material supply carrier relative to the material applicator assembly in a second rotational direction, opposite the first rotational direction, in response to the material applicator assembly rotating relative to the surface in the first rotational direction. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a system that comprises a robot and an end effector movably controlled by the robot to deliver material to a surface. The material supply is on-board the end effector, which applies the material onto the surface at a laydown point of the end-effector. The end-effector includes features that allow the laydown point to move independently of the material supply on-board the end effector. Accordingly, the end effector can accommodate on-board mounting of a heavy and bulky material supply, without the material supply obstructing the application of the material onto complex or contoured surfaces or the concurrent application of material by another robot. Additionally, the present end effector facilitates more responsive control of the rotation of the laydown point because the material supply need not be rotated along with the laydown point, which reduces the inertia necessary to rotate the laydown point.

Figure 1:
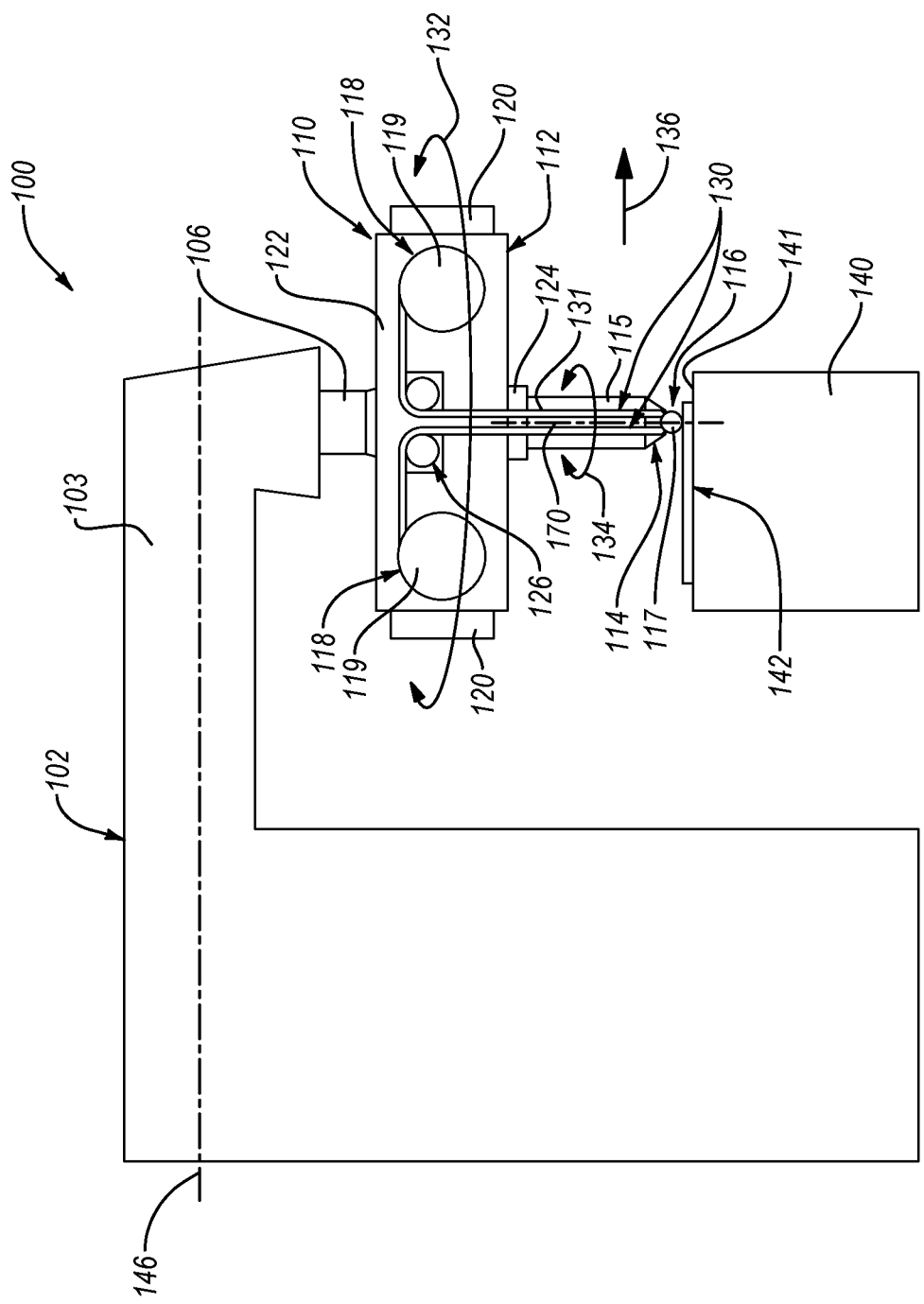
FIG. 1 is a schematic side view of a system for delivering a material to a surface, according to one or more examples of the present disclosure.

Referring to FIG. 1, according to some examples, disclosed herein is a system 100, for delivering a material 130 onto a surface 141, that includes a robot 102 and an end effector 110 coupleable to the robot 102. In the illustrated example, the end effector 110 is coupled to the robot 102 to deliver the material 130 onto the surface 141. The material 130 is any of various materials that can be applied onto the surface 141. In certain examples, the material 130 is a material tape 131 that is spoolable. The material tape 131 includes fibers, such as carbon fibers, glass fibers, and/or metal fibers in some examples. The fibers can be interwoven to form the material tape 131. For example, the material tape 131 is a metal matrix tape that comprises metal fibers (e.g., aluminum fibers) interwoven with non-metal fibers (e.g., glass fibers). Alternatively, the fibers are embedded in a polymeric material, such as resin or epoxy in a precured state, to form the material tape 131. For example, the material tape 131 can be a preimpregnated carbon fiber tape. According to other examples, the material 130 is a non-tape material, such as a liquid, paste, or non-fibrous material. In one example, the material 130 is a paint, sealant, or other coating, that can be sprayed, injected, or otherwise applied onto the surface 141. According to another example, the material 130 is a 3-D printing material, such as filaments made of polyethylene terephthalate (PET), acrylonitrile butadiene styrene (ABS), polypropylene, polycarbonate, nylon, polylactic acid, and metal.

The surface 141 is the surface of any of various objects 140 onto which the application of the material 130 is advantageous. In one example, the object 140 is a die or mold and the surface 141 defines a shape of a part to be formed by the die or mold. Accordingly, in certain implementations, the material 130 is a material tape 131 that is laid up on the surface 141 to form a layer 142 of a part. In other examples, the object 140 is a part and the surface 141 is a surface of the part. Accordingly, in certain implementations, the material 130 is applied directly onto the surface of a part to form a layer 142 of the part. In yet other examples, the object 140 is a previously applied layer of the material 130, such that the surface 141 is the surface of the previously applied layer. Accordingly, in some implementations, multiple layers of the material 130 are formed on top of each other, in a stacked arrangement, to form a part. In one implementation, the material 130 is a material tape 131 that is applied on top of each other to form a part made of multiple layers of the material tape 131. In another implementation, the material 130 is a 3-D printing material that is applied onto each other to form a part made of multiple layers of the 3-D printing material.

The robot 102, which is shown schematically, includes a support arm 103 to which the end effector 110 is coupled. The support arm 103 defines a support axis 146 that extends along a length of the support arm 103. The robot 102, although shown schematically as one piece, is articulated with multiple interconnected and independently moving parts in most examples. For example, the robot 102 includes a second actuator 106 corresponding with a first actuator 124 of the end effector 110. The second actuator 106 of the robot 102 movably couples the end effector 110 to the support arm 103. More specifically, in certain examples, the second actuator 106 is selectively operable to rotate the end effector 110 about a central axis 170 of the end effector 110.

The end effector 110 includes a material applicator assembly 114 and a material supply carrier 112. The end effector 110 additionally includes the first actuator 124. The material applicator assembly 114 is movably coupled with the material supply carrier 112 by the first actuator 124. More specifically, in certain examples, the first actuator 124 rotatably couples the material supply carrier 112 relative to the material applicator assembly 114. The first actuator 124 of the end effector 110 is operable to move (e.g., rotate) the material supply carrier 112 relative to the material applicator assembly 114. In other words, the first actuator 124 facilitates movement of the material supply carrier 112 relative to the material applicator assembly 114. Accordingly, in some examples, the system 100 includes a second actuator 106 that rotates the end effector 110 relative to the robot 102 and a first actuator 124 that rotates the material supply carrier 112 relative to the material applicator assembly 114.

The material supply carrier 112 includes a base 122 and a supply 118 of the material 130 coupled to the base 122. Generally, the base 122 provides a platform to which the supply 118 and the first actuator 124 can be coupled. In some examples, the base 122 includes a single plate-like element or multiple, spaced apart, plate-like elements that is or are strong enough to support the supply 118 of the material 130. According to the same or other examples, the base 122 is a box-like element. The supply 118 can include all the material 130 necessary to form a part. In other words, no portion of the material for forming the part comes from a supply that is not onboard the material supply carrier 112. In certain examples, although not shown, environmental condition control devices are coupled to and co-movable with the base 122. For example, temperature control devices can be coupled to the base 122 and be operable to regulate the temperature of material tape 131, such as to a temperature below room temperature, to reduce transfer of resin or epoxy to components of the end effector 110 prior to application of the material tape 131 onto a surface.

Figure 2:
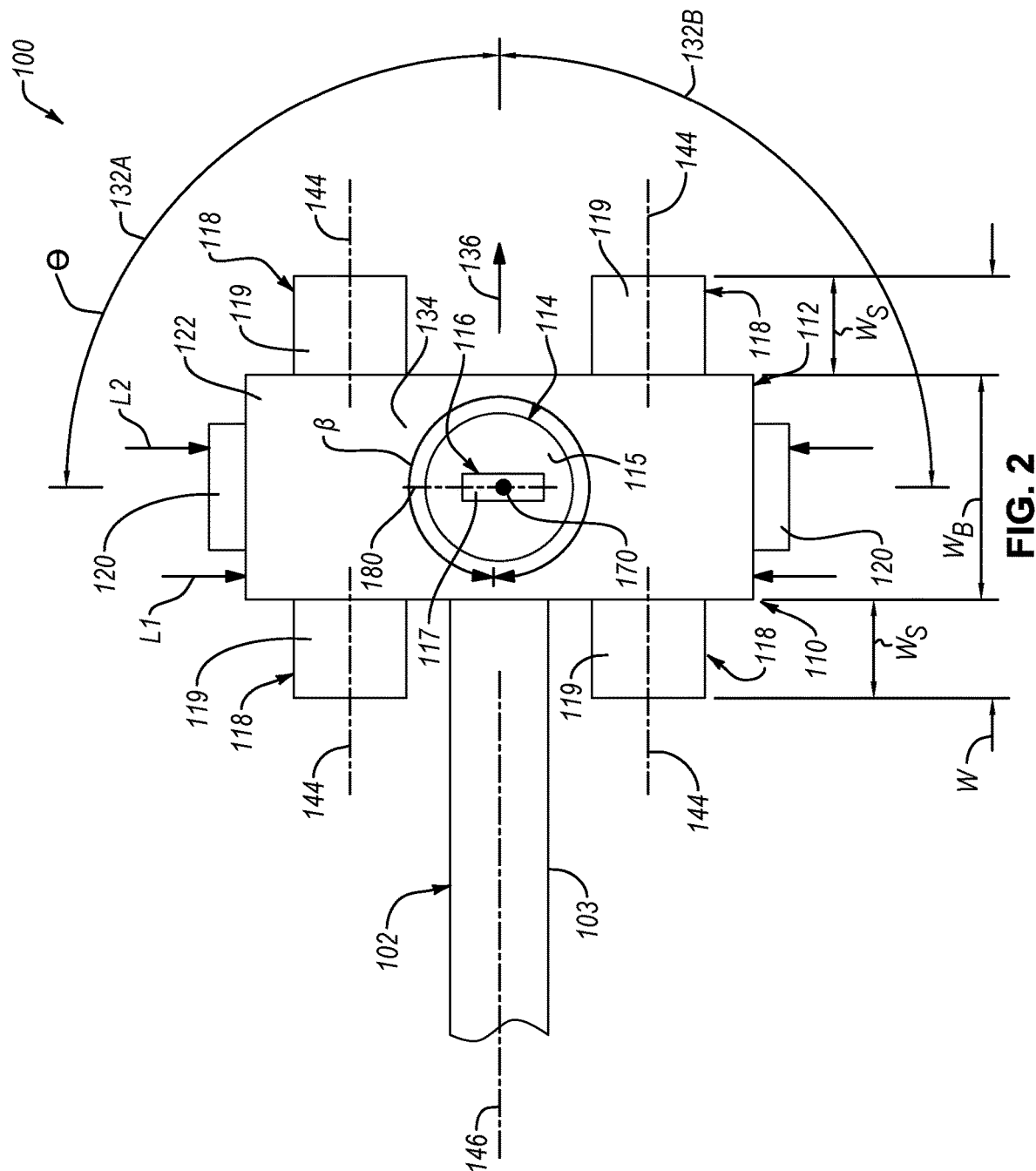
FIG. 2 is a schematic bottom view of the system of FIG. 1, with an end effector of the system in a first configuration, according to one or more examples of the present disclosure.

Referring to FIG. 2, the material supply carrier 112 has an overall length L2 and an overall width W. The overall length L2 of the material supply carrier 112 is greater than the overall width W of the material supply carrier 112.

The overall length L2 of the material supply carrier 112 may be equal to or greater than an overall length of the base 122, depending on how auxiliary components, hardware, or the supplies 118 of the material supply carrier 112 are mounted to the base 122. As shown in FIG. 2, the base 122 is elongated in a lengthwise direction along the base 122 such that the base 122 has a length L1 (i.e. an overall length of the base 122), parallel to the lengthwise direction. In certain examples, the length L1 of the base 122 is greater than a width $W_B$ of the base 122, which is a dimension of the base 122 perpendicular to the length L1 of the base 122. When no auxiliary components, hardware, or the supplies 118 are mounted to and protrude from the ends of the base 122, the overall length L2 of the material supply carrier 112 is equal to the length L1 of the base 122. However, when auxiliary components, hardware, or the supplies 118 are mounted to and protrude from the ends of the base 122, the overall length L2 of the material supply carrier 112 is equal to the length L1 of the base 122 plus the dimensions the auxiliary components, hardware, or the supplies 118 protrude from the ends of the base 122. For example, as shown in FIG. 2, an electronics control module 120, of the end effector 110, is coupled to each one of the ends of the base 122 such that the overall length L2 of the material supply carrier 112 is equal to the length L1 of the base 122 plus the protruding dimensions of the electronics control modules 120. The electronics control module 120 includes electronics for controlling feed of the material 130 from the supply 118 to an applicator 116 of the material applicator assembly 114 and for controlling the first actuator 124.

The overall width W of the material supply carrier 112 may be equal to or greater than the width $W_B$ of the base 122, depending on how auxiliary components, hardware, or the supplies 118 of the material supply carrier 112 are mounted to the base 122. When no auxiliary components, hardware, or the supplies 118 are mounted to and protrude from the sides of the base 122, the overall width W of the material supply carrier 112 is equal to the width $W_B$ of the base 122. However, when auxiliary components, hardware, or the supplies 118 are mounted to and protrude from the sides of the base 122, the overall width W of the material supply carrier 112 is equal to the width $W_B$ of the base 122 plus the dimensions the auxiliary components, hardware, or the supplies 118 protrude from the sides of the base 122. For example, as shown in FIG. 2, the overall width W of the material supply carrier 112 is equal to the width $W_B$ of the base 122 plus the widths $W_S$ of the supplies 118 protruding from the sides of the base 122.

The configuration of the supply 118 and placement of the supply 118 on the base 122 is dependent on the type of the material 130. According to one example, the material 130 includes the material tape 131 and the supply 118 includes a spool 119. The spool 119 includes the material tape 131 in a spooled or wound arrangement about a central rod or spindle of the spool 119. The spool 119 is rotatably coupled to the base 122 and rotates relative to the base 122 as the material tape 131 is unwound or released from the spool 119. As shown in FIG. 2, the spool 119 rotates about a spool axis 144, relative to the base 122, as the material tape 131 is released from the spool 119. According to one example, the spool axis 144 is perpendicular to the length L1 of the base 122. Additionally, in such an example, the spool axis 144 can be perpendicular to the central axis 170 of the end effector 110.

In the illustrated examples, the material supply carrier 112 includes a plurality of spools 119 each including one of a plurality of material tapes 131. The material supply carrier 112 can include any number of spools 119. For example, the material supply carrier 112 includes at least four spools 119 in some implementations. In other implementations, the material supply carrier 112 includes at least eight spools 119. According to yet another implementation, the material supply carrier 112 includes at least sixteen spools 119. In one implementation, at least one of the spools 119 extends from the base 122 in a first direction and at least one of the spools 119 extends from the base 122 in a second direction, opposite the first direction.

The material applicator assembly 114 of the end effector 110 includes a central shaft 115 and an applicator 116 co-rotatably coupled to the central shaft 115. In one example, the central shaft 115 is directly coupled to the second actuator 106 of the robot 102 and is directly driven by the second actuator 106. In other words, the second actuator 106 rotates the end effector 110 by directly rotating the central shaft 115 about the central axis 170. The central shaft 115 can be any of various rotatable shaft-like elements have any of various cross-sectional shapes. The central shaft 115 can be hollow or non-hollow. In some implementations, the central shaft 115 is cylindrical shaped. Moreover, the central shaft 115 can have a one-piece or a multi-piece construction.

The base 122 of the material supply carrier 112 is coupled to the central shaft 115 of the material applicator assembly 114 in some examples. Rotation of the central shaft 115 about the central axis 170, by the second actuator 106 and as indicated by rotational arrows 134, also rotates the base 122 of the material supply carrier 112 about the central axis 170 if selective rotation of the material supply carrier 112 relative to the material applicator assembly 114 is not engaged. The first actuator 124 is interposed between, and coupled to, the material supply carrier 112 and the material applicator assembly 114 in some examples. The first actuator 124 includes two portions that are rotatable relative to each other about the central axis 170. One of the portions is directly co-movably coupled to the base 122 of the material supply carrier 112 and the other of the portions is directly co-movably coupled to the central shaft 115 material applicator assembly 114. Actuation of the portions of the first actuator 124 rotates the material supply carrier 112 relative to the material applicator assembly 114 about the central axis 170 as indicated by rotational arrows 132. In this manner, the material supply carrier 112 can be rotated by the first actuator 124 independently of the rotation of the material applicator assembly 114 by the second actuator 106 of the robot 102.

However, in alternative examples, the base 122 of the material supply carrier 112 is directly coupled to the second actuator 106 of the robot 102 and is directly driven by the second actuator 106. In other words, the second actuator 106 rotates the end effector 110 by directly rotating the base 122 about the central axis 170. Rotation of the base 122 about the central axis 170, by the second actuator 106, also rotates the central shaft 115 of the material applicator assembly 114 about the central axis 170 if selective rotation of the material applicator assembly 114 relative to the material supply carrier 112 is not engaged. Like the previous examples, the first actuator 124 is interposed between, and coupled to, the material supply carrier 112 and the material applicator assembly 114 in these alternative examples. Actuation of the portions of the first actuator 124 rotates the material applicator assembly 114 relative to the material supply carrier 112 about the central axis 170. In this manner, the material supply carrier 112 can be rotated by the second actuator 106 independently of the rotation of the material applicator assembly 114 by the first actuator 124.

The applicator 116 is configured to apply the material 130 onto the surface 141. Accordingly, the configuration of the applicator 116 is dependent on the type of the material 130. According to one example, the material 130 includes the material tape 131 and the applicator 116 is a compaction roller 117. The compaction roller 117 includes a roller axis 180 and is rotatable, relative to the central shaft 115, about the roller axis 180 to apply the material tape 131 onto the surface 141. In some examples, the compaction roller 117 is oriented relative to the central shaft 115 such that the roller axis 180 is perpendicular to the central axis 170. Such an orientation facilitates rolling of the compaction roller 117 against the surface 141 in an application direction 136. The compaction roller 117 compacts (e.g., compresses) the material tape 131 against the surface 141, which acts to deliver the material tape 131 onto the surface 141.

The material 130 is fed to the applicator 116 from the supply 118. Accordingly, the material 130 is fed from the material supply carrier 112 of the end effector 110 to the material applicator assembly 114 of the end effector 110. The end effector 110 further includes a material feed assembly 126. The material feed assembly 126 includes any of various components configured to direct the material 130 from the supply 118 to the applicator 116. For example, where the material 130 is the material tape 131, the material feed assembly 126 can include a series of pulleys that reorient and/or redirect the material tape 131 from the spool 119 to the compaction roller 117. The material feed assembly 126 may span from the material supply carrier 112 to the material applicator assembly 114. In some examples, a portion of the material feed assembly 126 forms part of, or is coupled to, the material supply carrier 112 and a portion of the material feed assembly 126 forms part of, or is coupled to, the material applicator assembly 114. Accordingly, the material feed assembly 126 can be on the material supply carrier 112, the materials applicator assembly 114, or both. Regardless, the material feed assembly 126 is configured to feed the material 130 from the supply 118 to the applicator 116 without impeding the ability of the material supply carrier 112 to rotate relative to the material applicator assembly 114 while the material 130 is fed.

Figure 11:
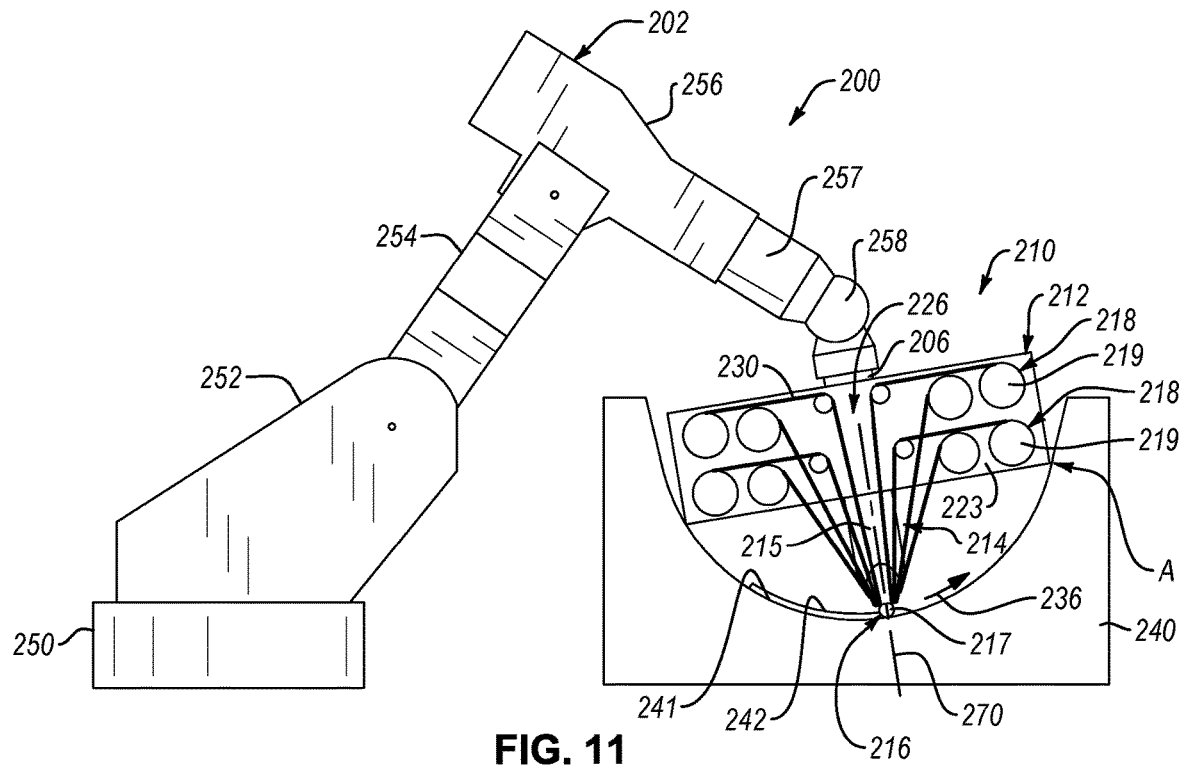
FIG. 11 is a schematic side view of the system of FIG. 9, according to one or more examples of the present disclosure.
Figure 12:
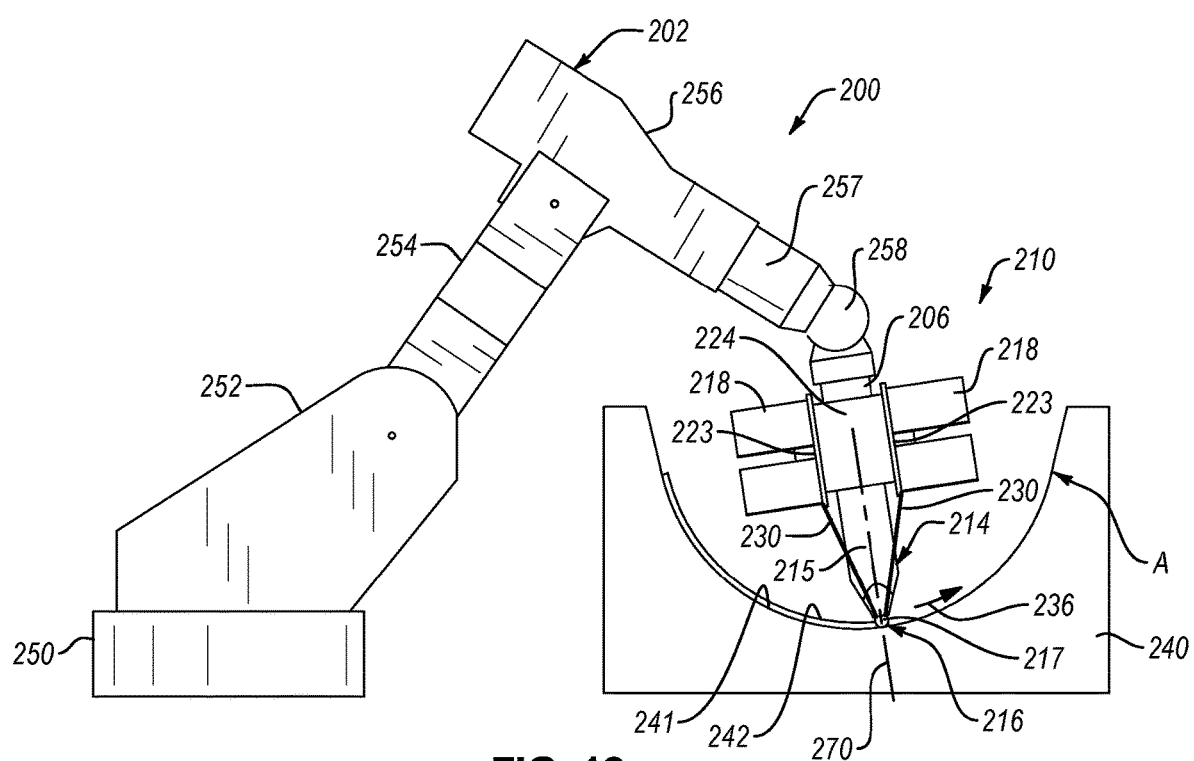
FIG. 12 is a schematic side view of the system of FIG. 10, according to one or more examples of the present disclosure.

The robot 102 is operable to translationally move the end effector 110 in the application direction 136 such that a center point of the applicator 116 moves along the surface 141 in the application direction 136. When the surface 141 is contoured, such as shown in FIGS. 11 and 12, the robot 102 is configured to adjust the position (e.g., height) of the applicator 116 to continue moving in the application direction 136 along the contoured portion of the surface 141. Adjustment of the applicator 116 can be made by tilting or raising or lowering the end effector 110 using one or more articulating members of the robot 102. However, under some circumstances, such as specifically contoured surfaces, use of multiple robots in a single cell operation, and the like, rotation of the material supply carrier 112 relative to the material applicator assembly 114 is needed to avoid or reduce the risk of obstruction of the material supply carrier 112 with the surface 141 or another robot or with the robot to which the end effector 110 is coupled. Referring to FIGS. 2-7, several examples of the end effector 110 with the material supply carrier 112 and the material applicator assembly 114 in various configurations are shown.

Referring to FIG. 2, in some examples where the central shaft 115 is directly rotated by the second actuator 106 of the robot 102, the material applicator assembly 114, including the central shaft 115 and the applicator 116, can be rotated an angle β relative to the robot 102. In certain implementations, the angle β is any angle between 0° and 360°. The material supply carrier 112, being coupled to the material applicator assembly 114, can also be rotated the angle β relative to the robot 102. In contrast, the material supply carrier 112, including the base 122 and the supply 118, can be rotated by the first actuator 124 of the end effector 110 an angle θ relative to the material applicator assembly 114. In certain implementations, the angle θ is any angle between 0° and 180°. In some implementations, the first actuator 124 is configured to rotate the material supply carrier 112 +/−90° relative to the application direction 136 of the applicator 116. In other words, the first actuator 124 is operable to rotate the material supply carrier 112 into any angle within a first rotational range 132A of 90° to one side of the application direction 136 and into any angle within a second rotational range 132B of 90° to the other side of the application direction 136. Of course, in other examples, the first rotational range 132A and the second rotational range 132B can be more or less than 90°, such that the angle θ can be any angle between 0° and an angle less than or greater than 180°. Rotation of the material supply carrier 112 in this manner also results in a corresponding twisting of the material 130. Generally, the material 130 can twist up to some maximum twist angle that is dependent on the width of the material 130 and the length of the twisted portion of the material 130. Above the maximum twist angle (i.e., when the material 130 is twisted more than the maximum twist angle), the material 130 will fold onto itself. In some examples, due to twisting limitations of the material 130 and to prevent folding of the material 130, rotation of the material supply carrier 112 relative to the application direction 136 of the applicator 116 is limited to angles that result in a twisting angle of the material 130 at or below the maximum twist angle of the material 130.

In FIG. 2, the end effector 110 is configured such that the overall length L2 of the material supply carrier 112 is perpendicular to the application direction 136. Additionally, in this example, the spool axes 144 of the spools 119 are parallel with the application direction 136. Moreover, in FIG. 2, the application direction 136 is parallel to the support axis 146 of the robot 102. Such a configuration can be used when the surface 141 is contoured (e.g., concave) in the application direction 136. In this configuration, the longest portion of the end effector 110, which is the overall length L2 of the material supply carrier 112, is, in effect, swung out of the way of the surface 141 so that the shorter dimension of the material supply carrier 112 (e.g., the width W), and not the longer dimension (e.g., the overall length L2), protrudes in the application direction 136 so as to reduce the possibility of the material supply carrier 112 interfering with the contoured surface.

Figure 3:
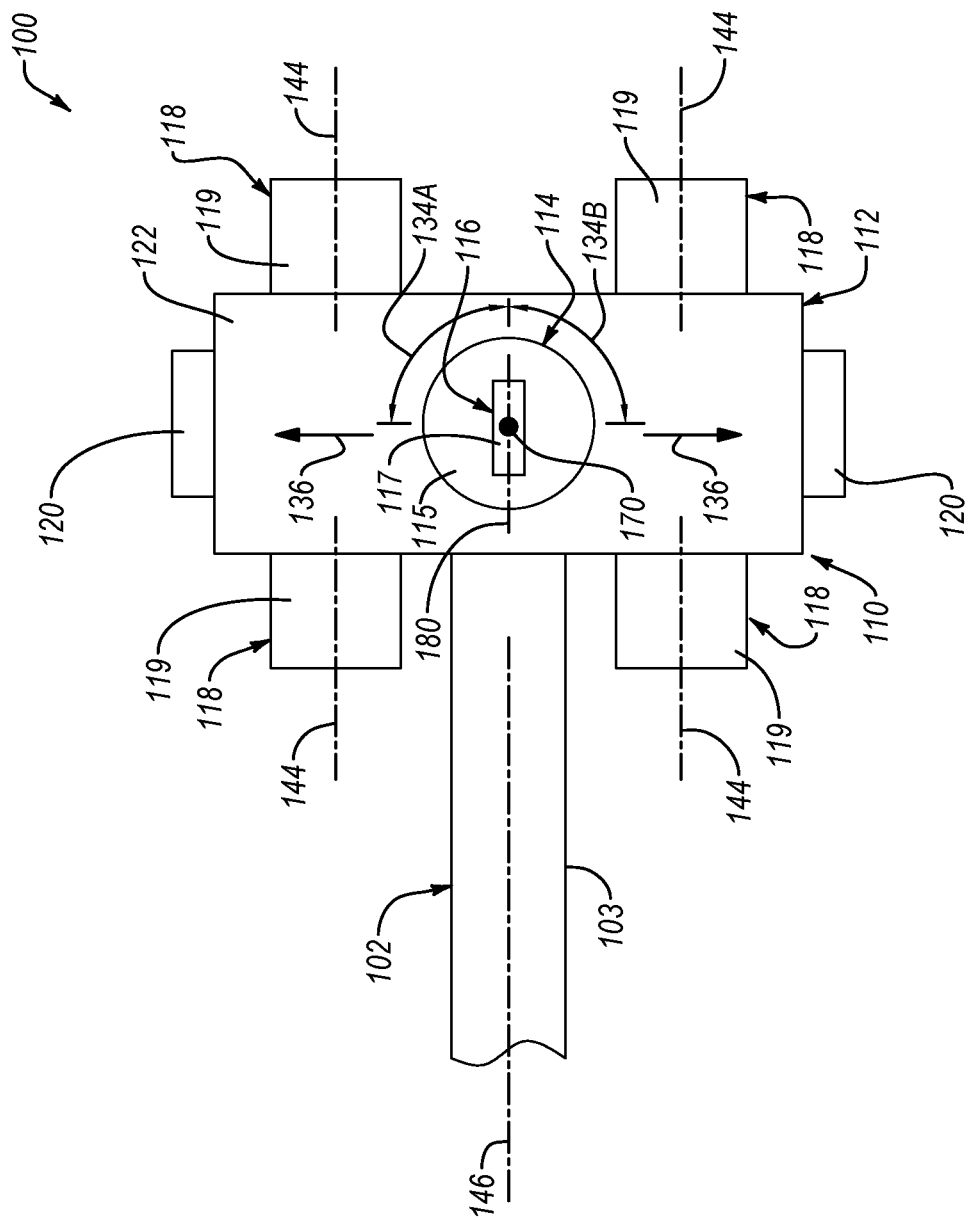
FIG. 3 is a schematic bottom view of the system of FIG. 1, with the end effector of the system in a second configuration, according to one or more examples of the present disclosure.

Referring to FIG. 3, the central shaft 115 is directly rotated by the second actuator 106 of the robot 102, which has rotated the material applicator assembly 114 ninety-degrees in one direction or the other relative to the support axis 146. In this configuration, the application direction 136 is perpendicular to the support axis 146. As the material applicator assembly 114 is rotated, the first actuator 124 rotates the material supply carrier 112, relative to the material applicator assembly 114, a corresponding amount so that the overall length L2 of the material supply carrier 112 remains perpendicular to the support axis 146, but is now parallel with the application direction 136. Such a configuration may be helpful to avoid obstruction with another robot and end effector applying material onto the same surface in the same direction.

Figure 4:
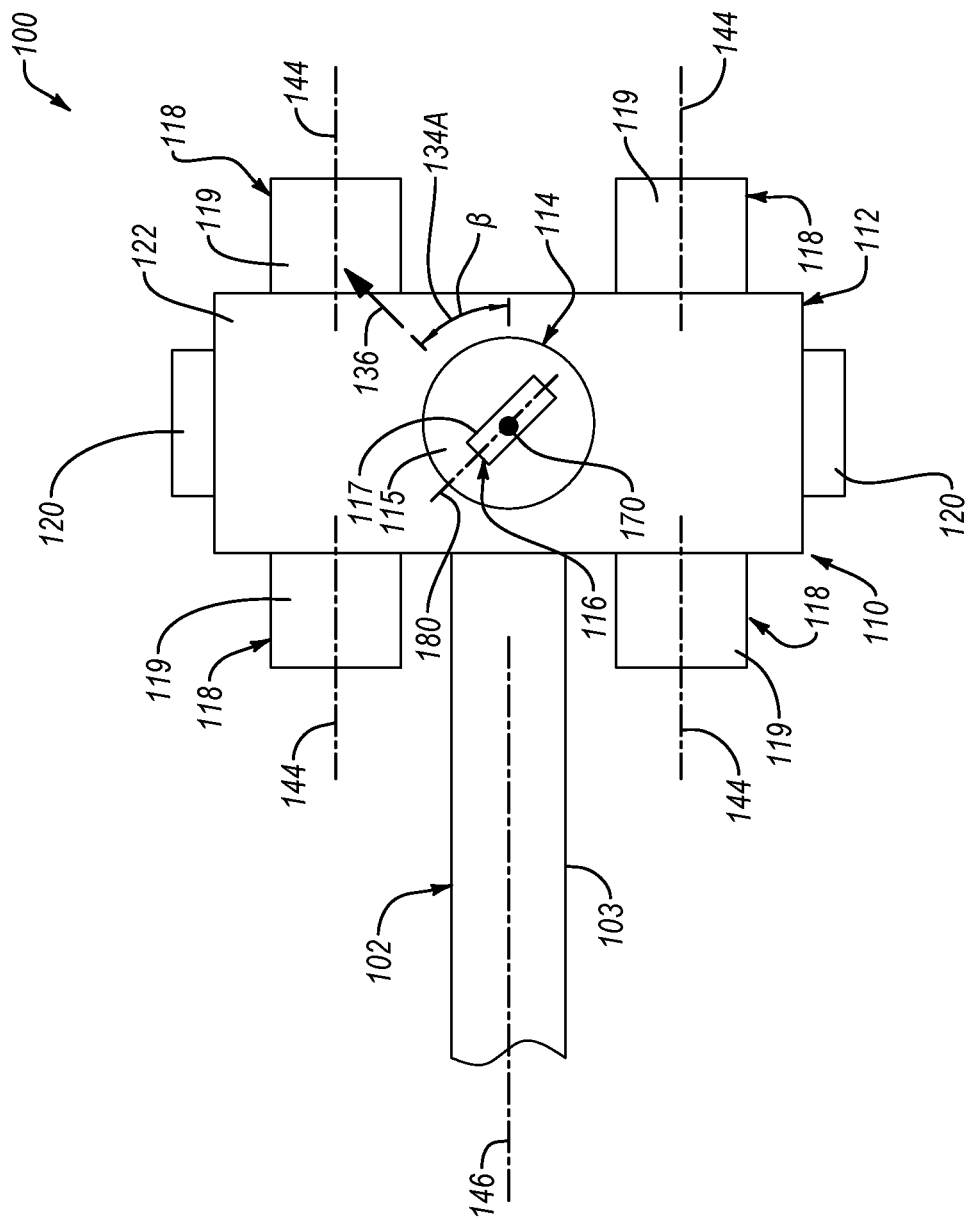
FIG. 4 is a schematic bottom view of the system of FIG. 1, with the end effector of the system in a third configuration, according to one or more examples of the present disclosure.

In FIG. 4, the central shaft 115 is directly rotated by the second actuator 106 of the robot 102, which has rotated the material applicator assembly 114 an angle β less than ninety-degrees in one direction relative to the support axis 146. In this configuration, the application direction 136 is angled, but not perpendicular, relative to the support axis 146. As the material applicator assembly 114 is rotated, the first actuator 124 rotates the material supply carrier 112, relative to the material applicator assembly 114, a corresponding amount so that the overall length L2 of the material supply carrier 112 remains perpendicular to the support axis 146, but is now angled relative to the application direction 136.

Figure 5:
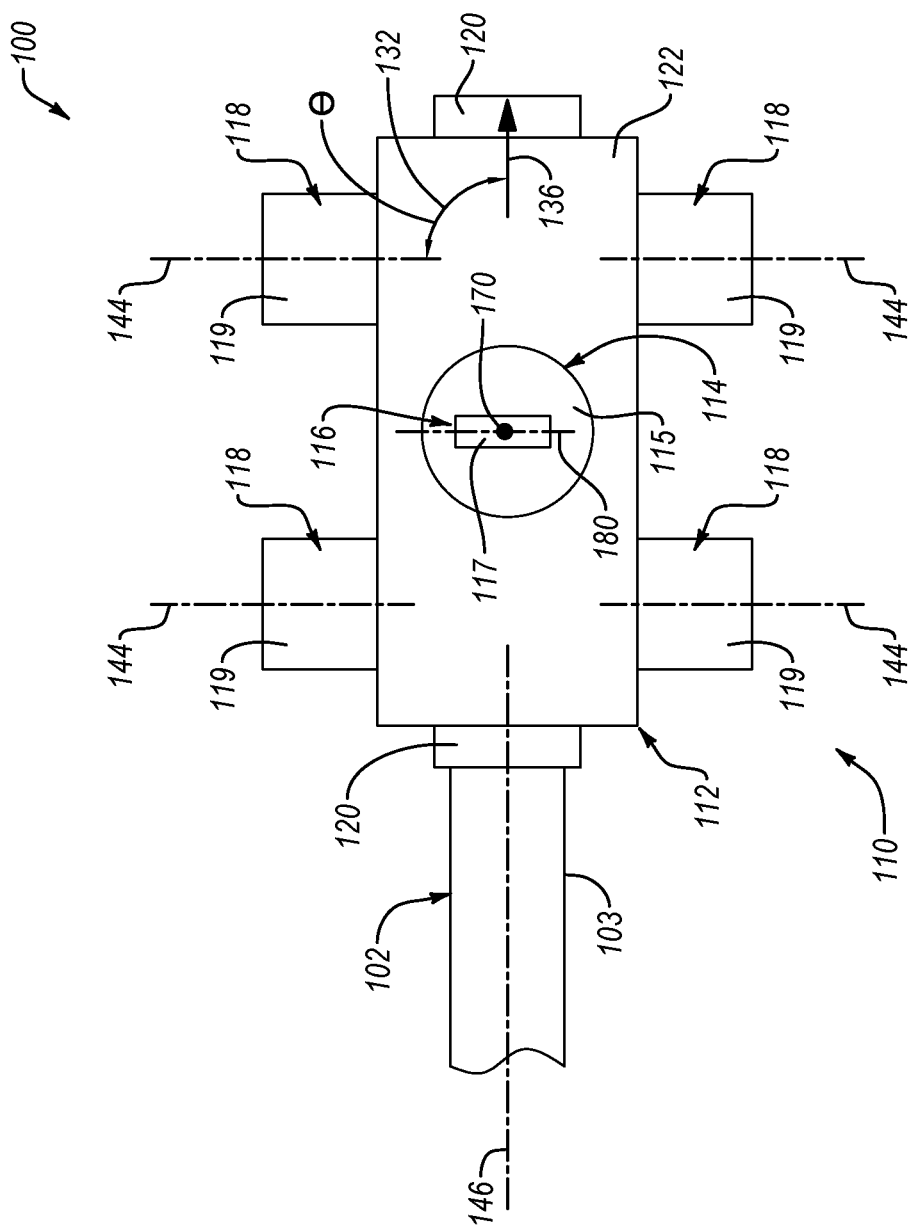
FIG. 5 is a schematic bottom view of the system of FIG. 1, with the end effector of the system in a fourth configuration, according to one or more examples of the present disclosure.

According to FIG. 5, a configuration of the end effector 110, consistent with that shown in FIG. 1, is shown. In FIG. 5, the end effector 110 is configured such that the overall length L2 of the material supply carrier 112 is parallel to the application direction 136, which is parallel with the support axis 146 of the robot 102. Additionally, in this example, the spool axes 144 of the spools 119 are perpendicular to the application direction 136. Such a configuration can be used when the surface 141 is flat or convex in the application direction 136 or concave in a direction perpendicular to the application direction. Additionally, such a configuration may be helpful to avoid obstruction with another robot and end effector applying material onto the same surface in an opposite direction (see, e.g., FIG. 14).

Figure 6:
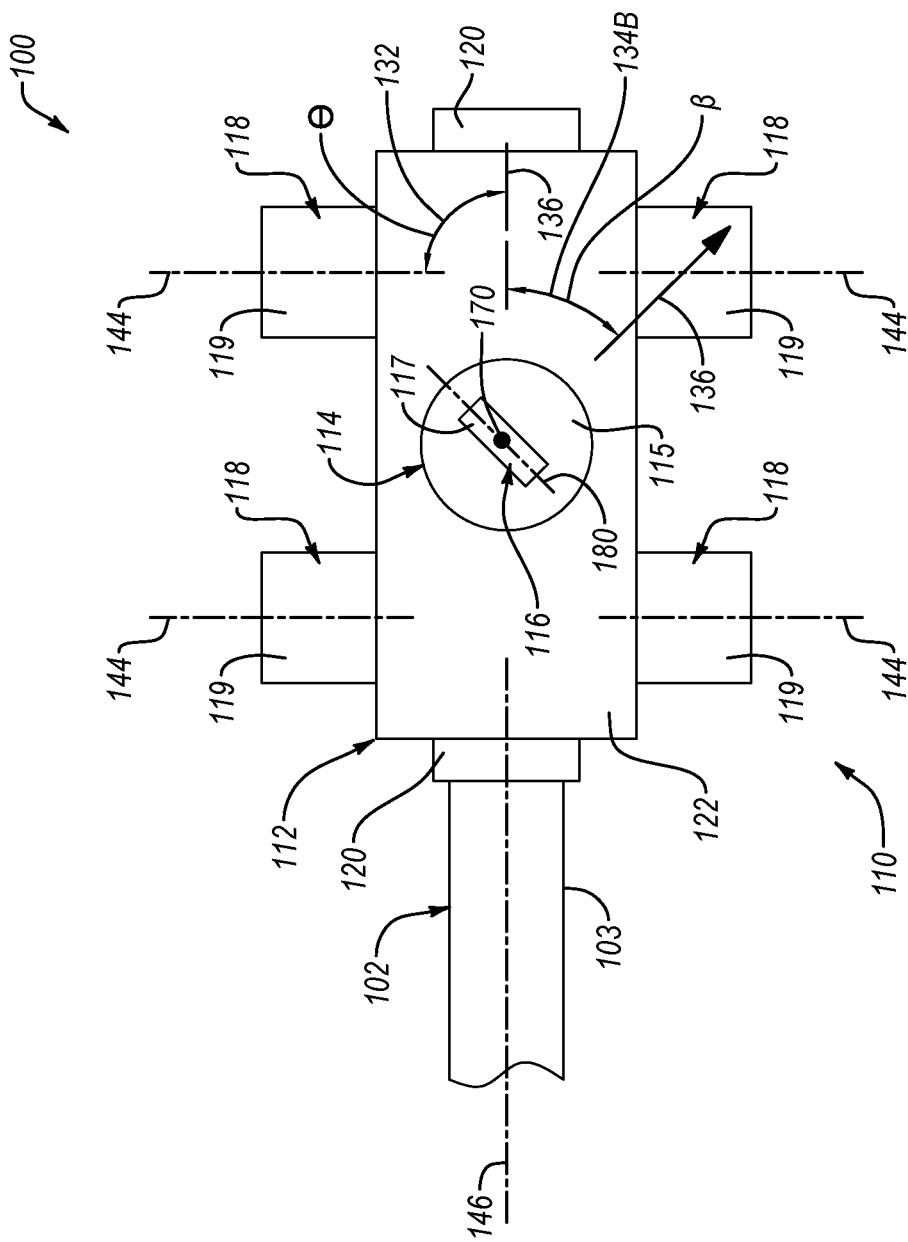
FIG. 6 is a schematic bottom view of the system of FIG. 1, with the end effector of the system in a fifth configuration, according to one or more examples of the present disclosure.

In FIG. 6, the orientation of the material supply carrier 112 is similar to that of the material supply carrier 112 in FIG. 5, but the material applicator assembly 114 is rotated at an angle β relative to the support axis 146 of the robot 102. As the material applicator assembly 114 is rotated, the first actuator 124 rotates the material supply carrier 112, relative to the material applicator assembly 114, a corresponding amount so that the overall length L2 of the material supply carrier 112 remains parallel to the support axis 146, but is angled relative to the application direction 136.

Figure 7:
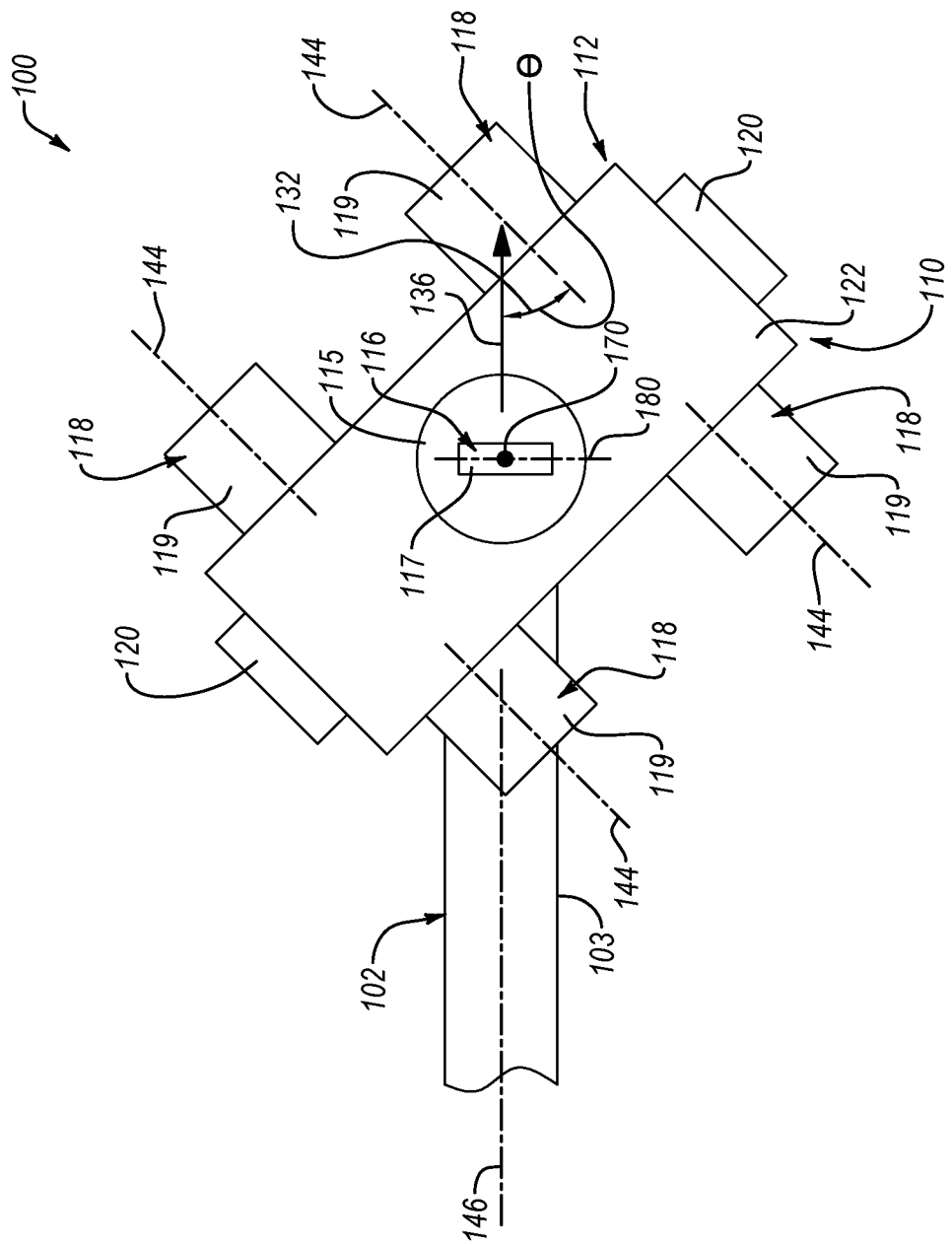
FIG. 7 is a schematic bottom view of the system of FIG. 1, with the end effector of the system in a sixth configuration, according to one or more examples of the present disclosure.
Figure 8:
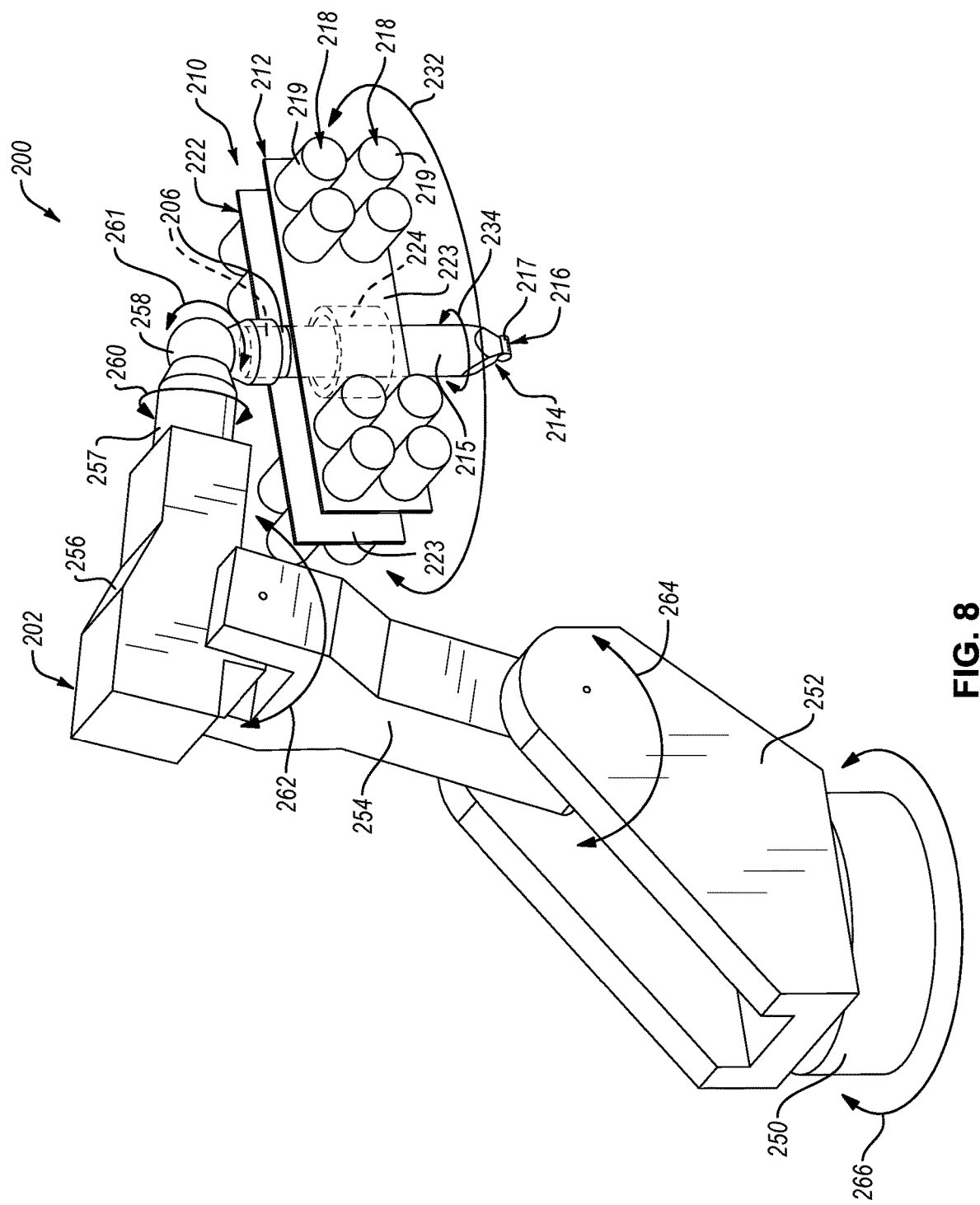
FIG. 8 is a schematic perspective view of a system for delivering a material to a surface, according to one or more examples of the present disclosure.

According to FIG. 7, the material supply carrier 112 is oriented such that the overall length L2 of the material supply carrier 112 is angled, at an angle θ that is greater than zero, but less than 90, relative to the support axis 146 of the robot 102. Moreover, the material applicator assembly 114 is oriented such that the application direction 136 is parallel with the support axis 146. Such a configuration can be used when the surface 141 has a complex contour or may be helpful to avoid obstruction with another robot and end effector applying material onto the same surface at an angle with its support axis and in an opposite direction.

Referring now to FIGS. 8-12, according to some examples, a system 200, for delivering a material 230 onto a surface 241 to form a layer 242 on the surface 241, is disclosed. The system 200 includes features similar or analogous to the features of the system 100, with like numbers referring to like features. Accordingly, unless otherwise noted, the description of the features and functionality of the system 100 applies to the corresponding features and functionality of the system 200. The system 200 includes a robot 202 and an end effector 210 coupleable to the robot 202. In the illustrated example, the end effector 210 is coupled to the robot 202 to deliver the material 230 onto the surface 241 of an object 240.

The robot 202 includes multiple articulating members. In some examples, the robot 202 includes a footing 250 and a base 252 that is rotatable relative to the footing 250 about a vertical axis as indicated by directional arrows 266. The robot 202 further includes a connecting arm 254 that is rotatable relative to the base 252 about a horizontal axis as indicated by directional arrows 264. The robot 202 additionally includes a support arm 256 that is rotatable relative to the connecting arm 254 about a horizontal axis as indicated by directional arrows 262. The robot 202 further includes an end-effector extension arm 257 that is rotatable relative to the support arm 256 about its central axis as indicated by directional arrows 260. The robot 202 also includes an end-effector coupler 258 that is rotatable relative to the end-effector extension arm 257 about an axis, perpendicular to the central axis of the end-effector extension arm 257, as indicated by directional arrows 261.

The end-effector coupler 258 at least partially houses a second actuator 206 of the robot 202, which rotates the end effector 210 about a central axis 270 of a central shaft 215 of a material applicator assembly 214 of the end effector 210. The material applicator assembly 214 additionally includes an applicator 216, which is a compaction roller 217 in some examples.

Rotatably coupled to the material application assembly 214, by a first actuator 224, is a material supply carrier 212 of the end effector 210. The material supply carrier 212 includes a base 222 with two plates 223 that are parallel to each other. The central shaft 215 passes through the two plates 223. Moreover, the first actuator 224 is interposed between the two plates 223, which intercouples the plates 223 to the central shaft 215 and facilities relative rotation of the plates 223 and the central shaft 215. The material supply carrier 212 includes supplies 218 of a material 230, which, in some examples, are spools 219 of material tape 231. The end effector 210 further includes a material feed assembly 226 that includes any of various components configured to direct the material 230 from the supply 218 to the applicator 216.

Figure 9:
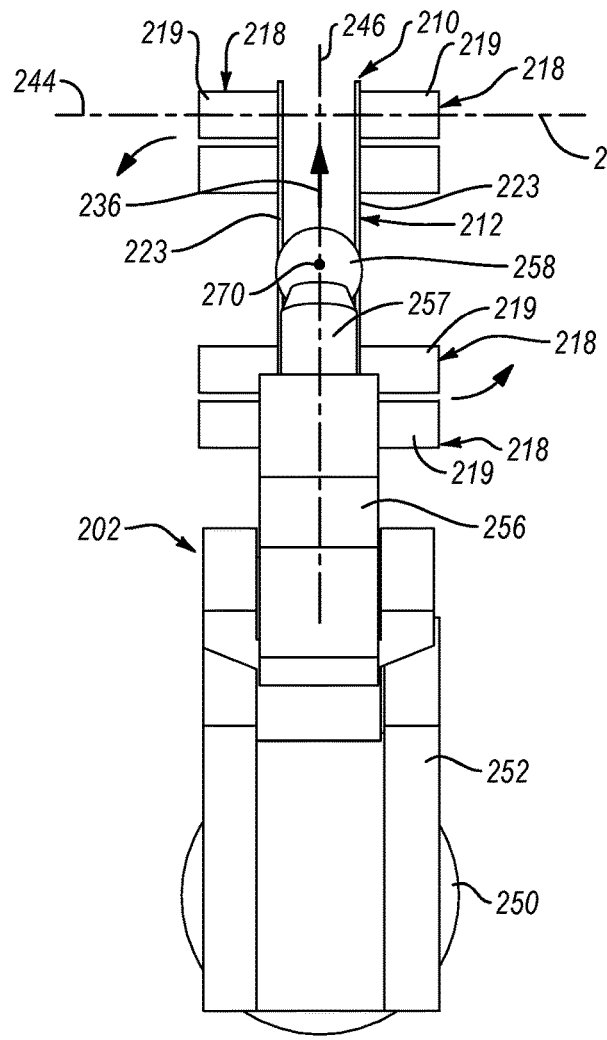
FIG. 9 is a schematic top view of the system of FIG. 8, with an end effector of the system in a first configuration, according to one or more examples of the present disclosure.
Figure 10:
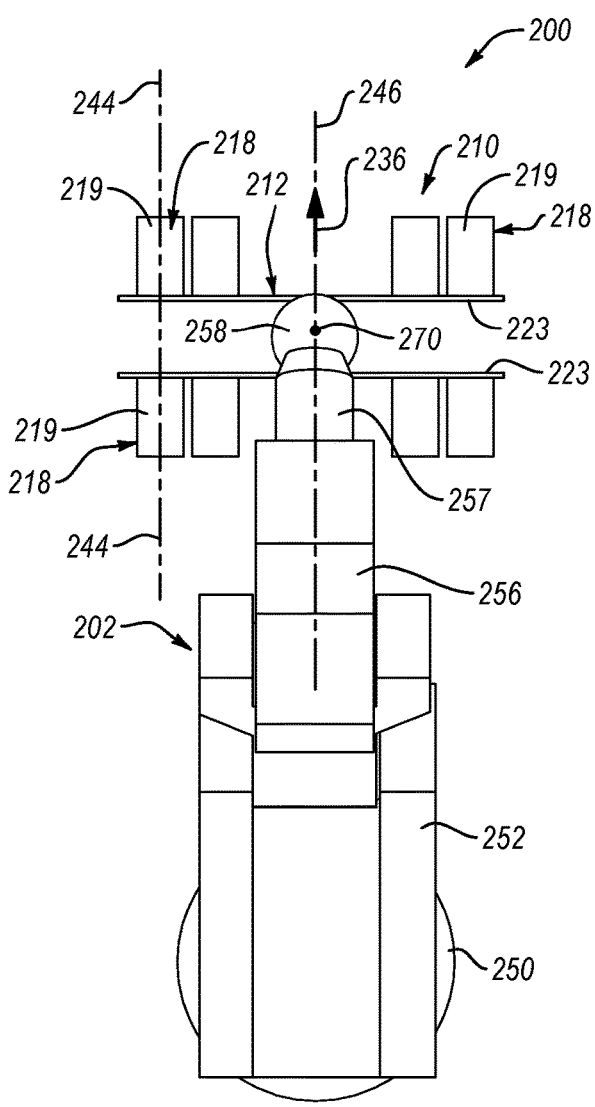
FIG. 10 is a schematic top view of the system of FIG. 8, with the end effector of the system in a second configuration, according to one or more examples of the present disclosure.

Referring to FIGS. 9 and 10, the first actuator 224 is operable to rotate the material supply carrier 212 relative to the material applicator assembly 214. For example, while the material applicator assembly 214 remains stationary relative to the support axis 246 of the robot 202, the first actuator 224 rotates the material supply carrier 212 relative to the support axis 246 from an orientation in which the plates 223 are parallel with the support axis 246 to an orientation in which the plates 223 are perpendicular to the support axis 246. Such a change in the orientation of the material supply carrier 212 relative to the material applicator assembly 214 can help to facilitate applying the material 130 onto the surface 241, when the surface is contoured. For example, as shown in FIG. 11, with the plates 223 parallel with the support axis 246, the length of the plates 223 may cause the plates 223 to interfere with the surface 241 at location A as the applicator 216 applies the material 230 onto the surface 241 in the application direction 236. However, by rotating the material supply carrier 212 relative to the material applicator assembly 214, as shown in FIG. 12, the length of the plates 223 is perpendicular to the application direction 236 and as such does not interfere with (e.g., creates a clearance at) the surface 241 at location A.

Figure 13:
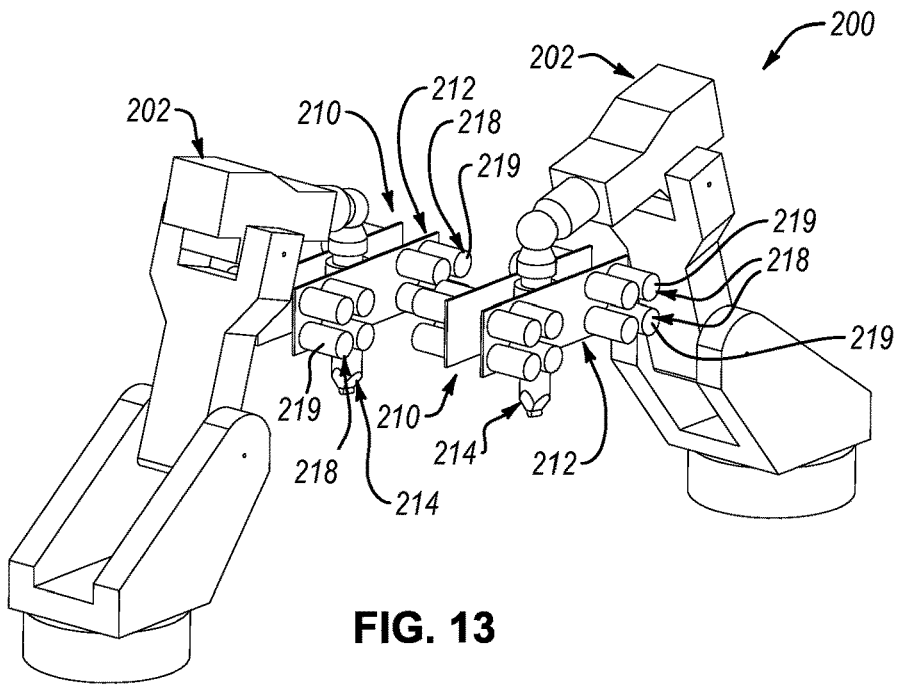
FIG. 13 is a schematic perspective view of a system for delivering a material to a surface, where the system includes two robots and two end effectors, according to one or more examples of the present disclosure.
Figure 14:
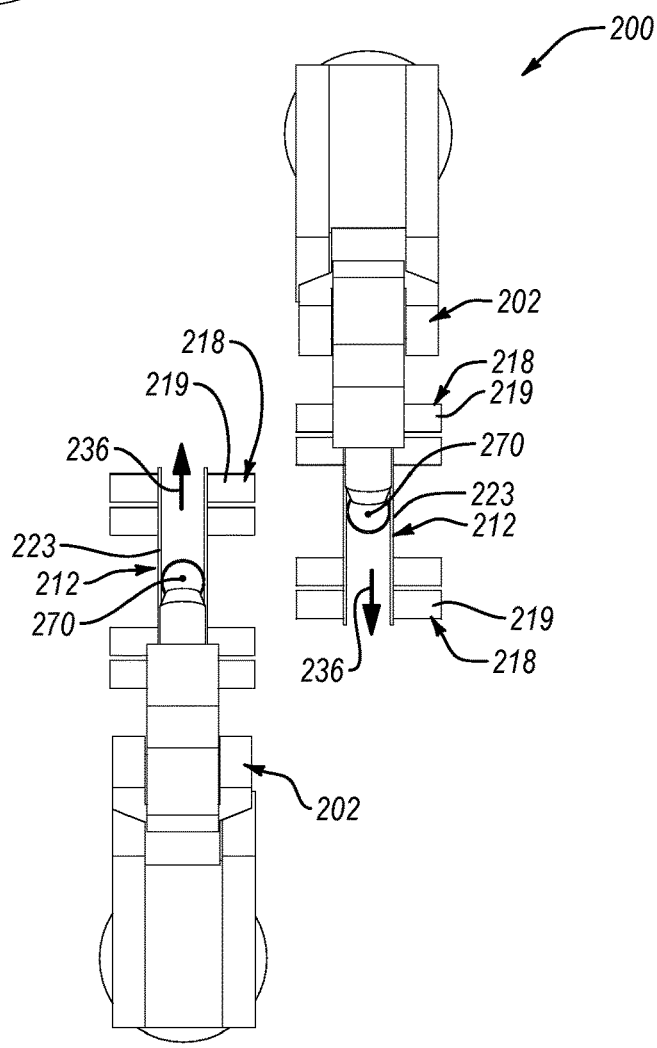
FIG. 14 is a schematic top view of the system of FIG. 13, according to one or more examples of the present disclosure.

In contrast to the operation of the system 200 represented in FIGS. 11 and 12, according to other examples shown in FIGS. 13 and 14 where the system 200 includes multiple robots 202 and multiple end effectors 212 each coupled to a corresponding one of the robots 202, the first actuator 224 of each end effector 210 rotates the material supply carrier 212 relative to the support axis 246 from an orientation in which the plates 223 are perpendicular to the application direction 236 to an orientation in which the plates 223 are parallel to the application direction 236. Such a change in the orientation of the material supply carrier 212 relative to the material applicator assembly 214 can help to facilitate multiple robots concurrently applying the material 230 onto the surface 241 in parallel and offset application directions 236. With the plates 223 parallel to the application directions 236, the footprint of the material supply carriers 212 in the application directions 236 is reduced, which allows the end effectors 210 to be located closer to each other in a side-by-side configuration compared to if the plates 223 were perpendicular to the application directions 236.

Automatic control of the robots 202 of FIGS. 13 and 14 and corresponding end effectors 210 (including rotation of the material supply carriers 212 relative to the material applicator assembly 114), to promote concurrent application of the material 230 onto a larger surface area of the object and to avoid collision with each other, can be based on predetermined or real-time data identifying of the location of one robot 202 relative to another robot 202. The predetermined data is obtained from a digital model (e.g., computer aided drafting (CAD) model) of the object 240 and known application patterns in some examples. In other examples, the predetermined data is obtained from physical or virtual sensors configured to determine the location of one robot 202 relative to anther robot 202.

Figure 15:
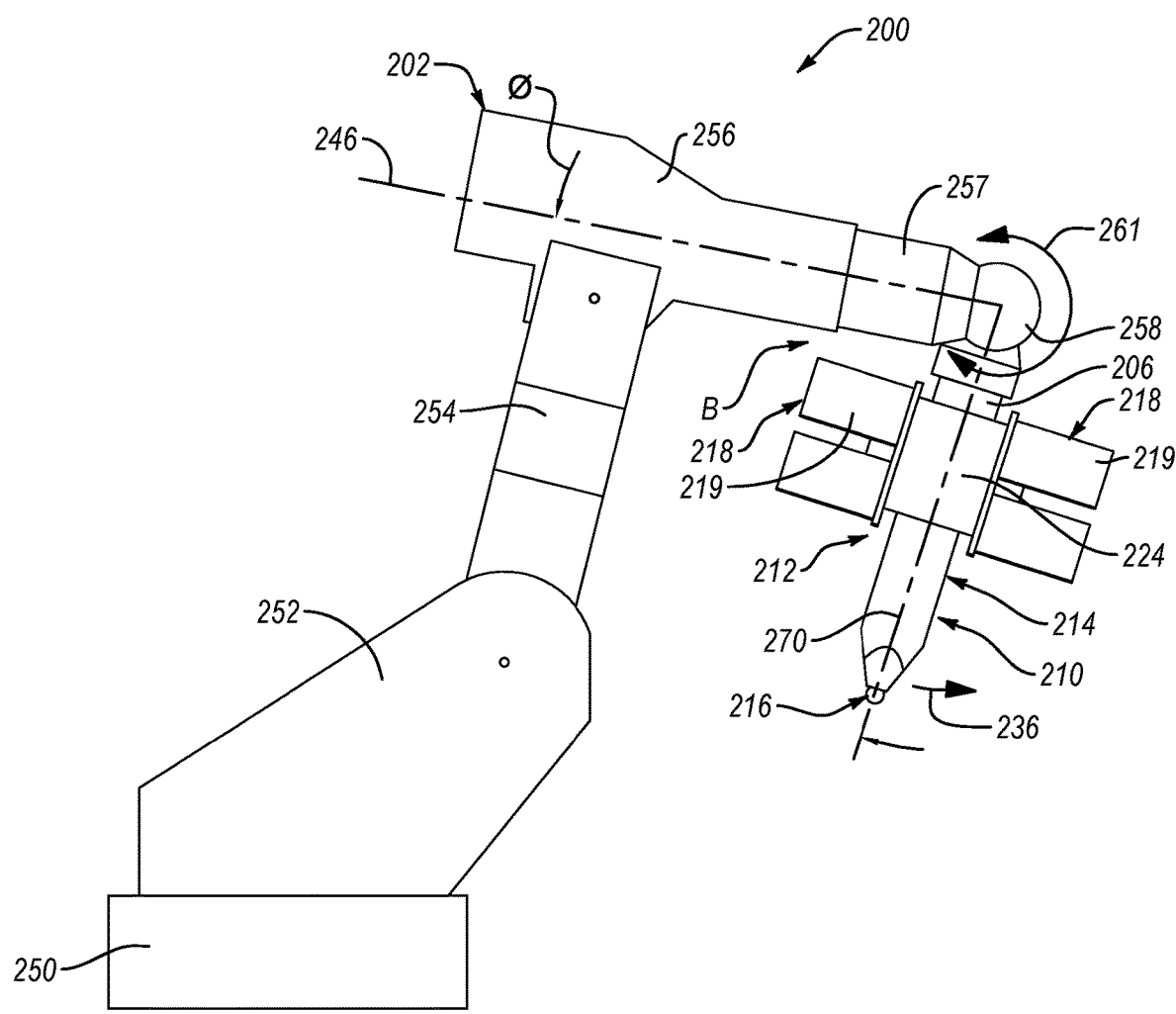
FIG. 15 is a schematic side view of a system for delivering a material to a surface, according to one or more examples of the present disclosure.

Referring to FIG. 15, as described above, the end-effector coupler 258 of the robot 202 is configured to rotate the end effector 210 in the rotational direction indicated by directional arrows 261 toward and away from the support arm 256. According to some examples, the first actuator 224 of the end effector 210 rotates the material supply carrier 212 relative to the support axis 246 into an orientation in which the plates 223 are perpendicular to the support axis 246 of the robot 202 to reduce the angle φ, between the central axis 270 and the support axis 246, at which the material supply carrier 212 contacts (see, e.g., point B) the support arm 256 of the robot 202 when rotated toward the support arm 256 by the end-effector coupler 258. In other words, the angle φ at which the material supply carrier 212 contacts the support arm 256, when rotated toward the support arm 256, is greater when the plates 223 are parallel with the support axis 246 than when the plates are perpendicular to the support axis 246. In some implementations, the end effector 210 is configured to automatically rotate the material supply carrier 212 relative to the support axis 246 into an orientation in which the plates 223 are perpendicular to the support axis 246 of the robot 202 when the angle φ decreases below some predetermined minimum angle. In this manner, the end effector 210 automatically increases the range the end effector 210 is allowed to swing toward the robot 202 by changing the orientation of the material supply carrier 212 relative to the material applicator assembly 114.

Automatic control of the robot 202 and the end effector 210, including rotation of the material supply carrier 212 relative to the material applicator assembly 114, is based on predetermined data identifying of the shape (e.g., contour) of the surface 241 in some examples. The predetermined data is obtained from a digital model (e.g., computer aided drafting (CAD) model) of the object 240 in some examples. In other examples, the predetermined data is obtained from physical or virtual sensors configured to determine the shape of the surface 241 prior to the material 230 being applied onto the surface 241.

Figure 16:
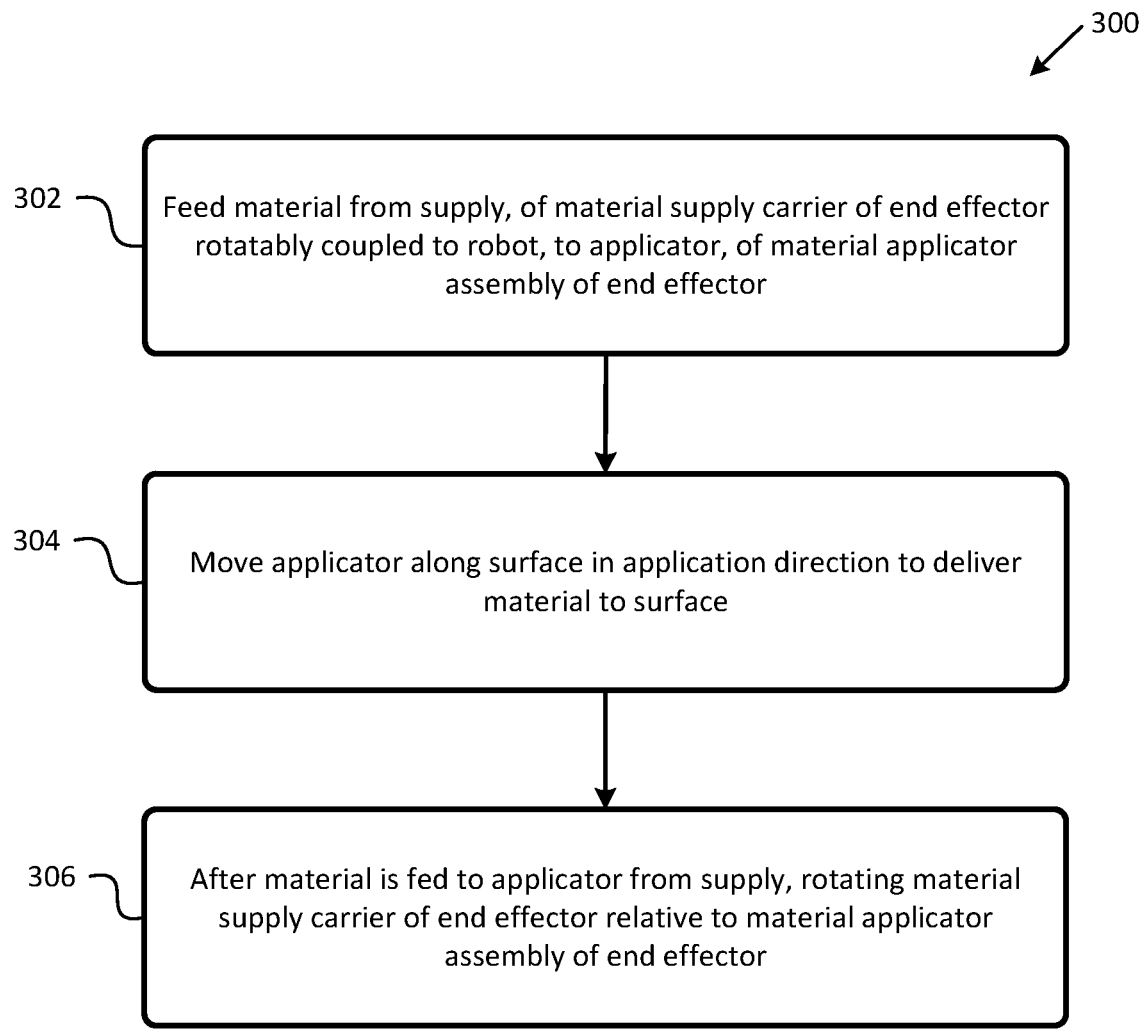
FIG. 16 is a schematic flow diagram of a method of delivering a material to a surface, according to one or more examples of the present disclosure.

Now referring to FIG. 16, according to certain examples, a method 300 of delivering the material 130 onto the surface 141 is shown. The method 300 is performed using any one or more of the examples of the system 100 or the system 200 disclosed herein. The method 300 includes (block 302) feeding the material 130 from the supply 118, of the material supply carrier 112 of the end effector 110, which is rotatably coupled to the robot 102, to the applicator 116 of the material applicator assembly 114 of the end effector 110. The method 300 also includes (block 304) moving the applicator 116 along the surface 141 in the application direction 136 to deliver the material 130 to the surface 141. After the material 130 is fed to the applicator 116 from the supply 118, the method 300 additionally includes (block 306) rotating the material supply carrier 112 of the end effector 110 relative to the material applicator assembly 114 of the end effector 110.

In certain examples of the method 300, the material supply carrier 112 is rotated relative to the material applicator assembly 114 at block 306 while the material 130 is fed to the applicator 116 and while the applicator 116 is moved along the surface 141 in the application direction 136. Accordingly, the material supply carrier 112 can be rotated relative to the material applicator assembly 114, such as to avoid interference with a changing contour of the surface 141, without interrupting the application of the material 130 onto the surface 141 by the applicator 116 of the material applicator assembly 114. The changing contour can be sensed, physically or virtually, by the system 100.

The material supply carrier 112 can be rotated any of various angles relative to the material applicator assembly 114 at block 306 of the method 300. However, in one example, the material supply carrier 112 is rotated, relative to the material applicator assembly 114, from a first position, in which the length L of the material supply carrier 112 is parallel to the application direction 136, to a second position, in which the length L of the material supply carrier 112 is non-parallel to the application direction 136. The material supply carrier 112 is rotated, relative to the material applicator assembly 114, from the first position to the second position when the surface 141 changes or when other circumstances demand. For example, the material supply carrier 112 can be rotated, relative to the material applicator assembly 114, from the first position to the second position when the surface 141 changes from a first concavity to a second concavity in the application direction 136. The first concavity can either be a zero concavity (e.g., flat or convex) or some concavity greater than zero, but the second concavity is greater than the first concavity. Relative rotation of the material supply carrier 112 and the material applicator assembly 114 can be performed automatically based on predetermined data, as described above.

As described above, it may be advantageous to maintain the relative orientation between the material supply carrier 112 and the material applicator assembly 114 as the robot 102 rotates the material applicator assembly 114, relative to the surface 141, to apply the material 130 in a different application direction 136. Accordingly, in some examples, block 306 of the method 300 includes automatically rotating the material supply carrier 112 relative to the material applicator assembly 114 in a second rotational direction, opposite the first rotational direction, in response to the material applicator assembly 114 rotating relative to the surface 141 in the first rotational direction. Moreover, in certain examples, the material supply carrier 112 is automatically rotated relative to the material applicator assembly 114 in a second rotational direction the same angular dimension as the material applicator assembly 114 is rotated relative to the surface 141 in the first rotational direction.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An end effector, coupleable to a robot, for delivering a material to a surface, the end effector comprising:
    a material applicator assembly, comprising a central shaft and an applicator rotatably coupleable to the robot and co-rotatably coupled to the central shaft, such that rotation of the central shaft about a central axis rotates the applicator about the central axis, wherein the applicator is configured to apply the material to the surface;
    a material supply carrier, comprising a base and a supply of the material fixed to the base such that the supply of material co-moves with the base, wherein the material from the supply is feedable to the applicator and wherein the base is coupled to the central shaft such that the base is rotatable about the central shaft and rotatable relative to the applicator; and
    an actuator, coupling the base to the central shaft, wherein the actuator is operable, in a first mode, such that the base rotates relative to the central shaft and the robot when the central shaft is rotating relative to the robot, and is operable in a second mode, such that the base co-rotates with the central shaft when the central shaft is rotating relative to the robot.

2. The end effector according to claim 1, wherein:
    the material comprises material tapes;
    the supply comprises a plurality of spools each comprising one of the material tapes;
    the applicator comprises a compaction roller that is rotatable about a roller axis to apply the material tapes onto the surface; and
    the central axis is perpendicular to the roller axis.

3. The end effector according to claim 2, wherein:
    the base is elongated; and
    a length of the base is perpendicular to the central axis.

4. The end effector according to claim 3, wherein:
    each of the spools is rotatable, about a spool axis, relative to the base to release the material tape from the spool; and
    the spool axis is perpendicular to the length of the base and the central axis.

5. The end effector according to claim 1, wherein the actuator is further operable to rotate the material supply carrier relative to the material applicator assembly while the material from the supply is fed to the applicator and the material is applied onto the surface by the applicator.

6. The end effector according to claim 1, wherein the actuator is further operable to rotate the material supply carrier relative to the material applicator assembly in response to a contour of the surface.

7. The end effector according to claim 1, further comprising an electronics control module fixed to the base and co-movable with the base, wherein the electronics control module comprises electronics for controlling feed of the material from the supply to the applicator and for controlling the actuator.

8. A system for delivering a material to a surface, the system comprising:
    a robot, comprising a support arm and a support-arm actuator fixed to an end of the support arm; and
    an end effector, coupled to the support-arm actuator, such that the support-arm actuator is interposed between the end effector and the support arm, wherein the end effector comprises:
        a material applicator assembly, comprising a central shaft and an applicator co-rotatably coupled to the central shaft, such that rotation of the central shaft about a central axis rotates the applicator about the central axis, wherein the applicator is configured to apply the material to the surface and wherein the central shaft is attached to the support-arm actuator such that rotation of the support-arm actuator relative to the support arm rotates the central shaft about the central axis relative to the support arm;
        a material supply carrier, comprising a base and a supply of the material fixed to the base such that the supply of material co-moves with the base, wherein the material from the supply is feedable to the applicator and wherein the base is coupled to the central shaft such that the base is rotatable about the central shaft and rotatable relative to the applicator; and
        a carrier actuator, coupling the base to the central shaft, wherein the carrier actuator is selectively operable, in a first mode, such that the base rotates relative to the central shaft, and is operable in a second mode, such that the base co-rotates with the central shaft;
    wherein the robot is selectively operable to translationally move the support arm and the end effector in an application direction while the applicator delivers the material from the supply to the surface.

9. The system according to claim 8, wherein the material comprises a continuous length of tape made of fibers.

10. The system according to claim 9, wherein the carrier actuator of the end effector is operable independently of the support-arm actuator of the robot to rotate the material supply carrier, relative to the material applicator assembly, independently of rotation of the material applicator assembly, relative to the robot, by the support-arm actuator of the robot.

11. The system according to claim 9, wherein the carrier actuator is further operable to automatically rotate the material supply carrier, relative to the material applicator assembly, in a first rotational direction a first angular dimension in response to the support-arm actuator rotating the material applicator assembly, relative to the robot, in a second rotational direction, opposite the first rotational direction, a second angular dimension equal to the first angular dimension.

12. The system according to claim 8, wherein the carrier actuator is further operable to rotate the material supply carrier relative to the material applicator assembly in response to a contour of the surface.

13. The system according to claim 8, wherein:
the carrier actuator rotates the material supply carrier about the central axis; and
the carrier actuator is further operable to rotate the material supply carrier relative to the material applicator assembly in response to an angle, defined between the central axis and the robot, decreasing below a predetermined minimum angle.

14. The system according to claim 8, wherein the robot is a first robot and the end effector is a first end effector, the system further comprising:
a second robot; and
a second end effector, wherein each one of the first end effector and the second end effector is rotatably coupled to a corresponding one of the first robot and the second robot;
wherein the carrier actuator of the first end effector, rotatably coupled to the first robot, is further operable to automatically rotate the material supply carrier of the first end effector relative to the material applicator assembly of the first end effector in response to a distance between the first end effector and the second end effector decreasing below a predetermined minimum distance.

15. The system according to claim 14, wherein a carrier actuator of the second end effector, rotatably coupled to the second robot, is further operable to automatically rotate a material supply carrier of the second end effector relative to a material applicator assembly of the second end effector in response to the distance between the first end effector and the second end effector decreasing below the predetermined minimum distance.

16. A method of delivering a material to a surface, the method comprising:
feeding the material from a supply, of a material supply carrier of an end effector rotatably coupled to a robot, to an applicator, of a material applicator assembly of the end effector;
moving the applicator, via movement of the robot, along the surface in an application direction to deliver the material to the surface; and
after the material is fed to the applicator from the supply, rotating the material applicator assembly, about a central axis, relative to the robot, and rotating the material supply carrier of the end effector, including the supply, relative to the robot about the central axis and about the material applicator assembly of the end effector,
wherein:
the material supply carrier is rotated, relative to the material applicator assembly, from the first position to the second position when the surface, along which the applicator is moved, changes from a first concavity in the application direction to a second concavity in the application direction;
the first concavity is either zero or non-zero; and
the second concavity is greater than the first concavity.

17. The method according to claim 16, wherein the material supply carrier is rotated relative to the material applicator assembly while the material is fed to the applicator and while the applicator is moved along the surface in the application direction.

18. The method according to claim 16, wherein:
the material supply carrier is elongated and has a length; and
the material supply carrier is rotated, relative to the material applicator assembly, from a first position, in which the length of the material supply carrier is parallel to the application direction, to a second position, in which the length of the material supply carrier is non-parallel to the application direction.

19. The method according to claim 16, further comprising rotating the material applicator assembly relative to the surface in a first rotational direction, wherein rotating the material supply carrier relative to the material applicator assembly comprises automatically rotating the material supply carrier relative to the material applicator assembly in a second rotational direction, opposite the first rotational direction, in response to the material applicator assembly rotating relative to the surface in the first rotational direction.

20. The method according to claim 16, wherein:
the end effector comprises a material applicator assembly, comprising a central shaft, wherein the central shaft and the applicator are rotatably coupleable to the robot and co-rotatably coupled to the central shaft, such that rotation of the central shaft about a central axis rotates the applicator about the central axis, wherein the applicator is configured to apply the material to the surface;
the material supply carrier comprises a base and the supply of the material is fixed to the base such that the supply of material co-moves with the base, wherein the material from the supply is feedable to the applicator and wherein the base is coupled to the central shaft such that the base is rotatable about the central shaft and rotatable relative to the applicator; and
the end effector further comprises an actuator, coupling the base to the central shaft, wherein the actuator is operable, in a first mode, such that the base rotates relative to the central shaft and the robot when the central shaft is rotating relative to the robot, and is operable in a second mode, such that the base co-rotates with the central shaft when the central shaft is rotating relative to the robot.

* * * * *